United States Patent [19]

Bissett

[11] 3,730,204
[45] May 1, 1973

[54] TEMPERATURE RESPONSIVE SAFETY VALVE STEMS
[75] Inventor: James S. Bissett, Bethel Park, Pa.
[73] Assignee: Gulf Oil Corporation, Pittsburgh, Pa.
[22] Filed: Sept. 23, 1971
[21] Appl. No.: 183,136

[52] U.S. Cl. ..........................137/68, 236/90, 251/73
[51] Int. Cl. ...............................................F16k 17/38
[58] Field of Search..............137/59–62, 67–71, 797; 236/90; 237/80; 251/66, 67, 73

[56] References Cited

UNITED STATES PATENTS

| 753,271 | 3/1904 | Hutton | 137/60 |
| 1,536,019 | 4/1925 | Kelley | 137/62 X |
| 1,878,002 | 9/1932 | Smith | 137/60 |
| 3,022,793 | 2/1962 | Thorp | 137/68 |

Primary Examiner—Martin P. Schwadron
Assistant Examiner—Richard Gerard
Attorney—Meyer Neishloss et al.

[57] ABSTRACT

The invention provides a safety valve stem structure for valves having a valve stem and requiring either rotational motion or translational motion to operate the active valve member. A cavity is formed within the stem and a weakened portion is formed in the stem near the cavity. The cavity is filled with a liquid which expands upon exposure to excessive heat and breaks the stem at the weakened portion. After breakage, the expanding liquid, sometimes with a spring assist, closes the valve member.

13 Claims, 9 Drawing Figures

Patented May 1, 1973

TEMPERATURE RESPONSIVE SAFETY VALVE STEMS

This invention pertains to fluid control valves, and more particularly the invention concerns structure to be added into such valves as a safety precaution so that the valve will automatically close in the event it is exposed to heat which produces a temperature greater than some predetermined temperature. The invention has particular utility in chemical plants, petroleum refineries, pipelines and associated apparatus handling such substances, wherein it is desired to close off a valve in response to a fire or other source of excessive heat and temperature. Under the usual circumstances, in the event of a fire in such locations, it may be impossible or at least highly dangerous for operators to get near enough to a valve to operate it because of the flames, smoke and heat of the fire. The invention may be though of as a thermostatic valve in that it will respond at or above a predetermined temperature to close the valve.

Virtually all valves for handling fluids which have stems may be characterized into one or two categories in accordance with the manner in which the stem is operated to move the active valve member. One of these two classes is typified by plug, toggle, or gate valves in which the active valving member moves up and down in its opening and closing motion, i.e., translational motion with respect to the axis of the valve stem. The second type or category of valves is typified by ball valves in which the active member rotates, and more generally is characterized by a rotational motion of the active valve member around the axis of the valve stem.

The invention provides a safety or thermostatic valve closing apparatus of the character described which is positive in operation, virtually instantaneous in closing a valve in response to excessive temperature, insensitive to temperature variations below the actuating temperature, maintenance free in use, simple and economical to manufacture with well-known techniques and components, inexpensive and easy to incorporate into new and existing valves, and generally efficient, sure and positive in operation and strong and durable to a high degree in normal use.

The present invention differs from conventional emergency valves having a fusable link or joint or the like in several important aspects. Firstly, valves embodying the present invention include the advantage of using the usual active valve member for both ordinary and emergency service, as opposed to prior devices wherein melting of a link or breaking of a solid joint activates a special emergency only valve member. The importance of this difference is that the possibility of the emergency valving apparatus becoming inoperative, as by corrosion in a pivot, or foreign matter wearing a valve seta, or jamming parts that should move in an emergency, or the like, is eliminated in that such occurrences would be detected during the normal operation of a valve embodying the invention, and would not be detected in such prior devices until the valve failed to respond to the emergency condition. Secondly, the emergency apparatus of the invention is totally enclosed in the valve stem, whereas in other prior valves a fusable link or a spring loaded member or the like is often external to the valve and thus subject to accidental damage, and requires periodic checking and maintenance, and the like.

The above and other advantages of the invention will be pointed out or will become evident in the following detailed description and claims, and in the accompanying drawing also forming a part of the disclosure, in which:

Figure 4:
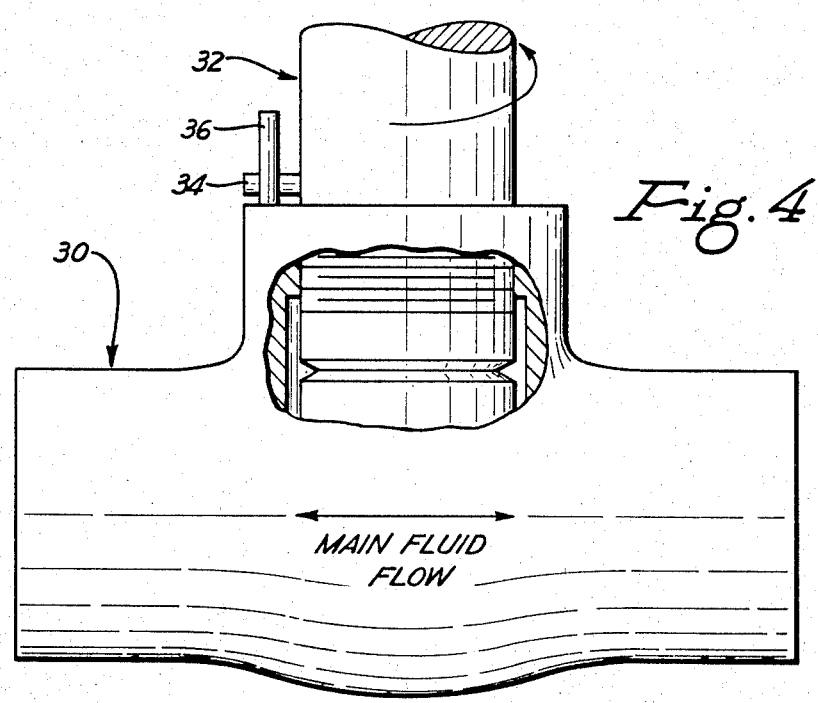
FIG. 4 is a view similar to FIG. 1 for the rotational stem motion types of valves.
Figure 9:
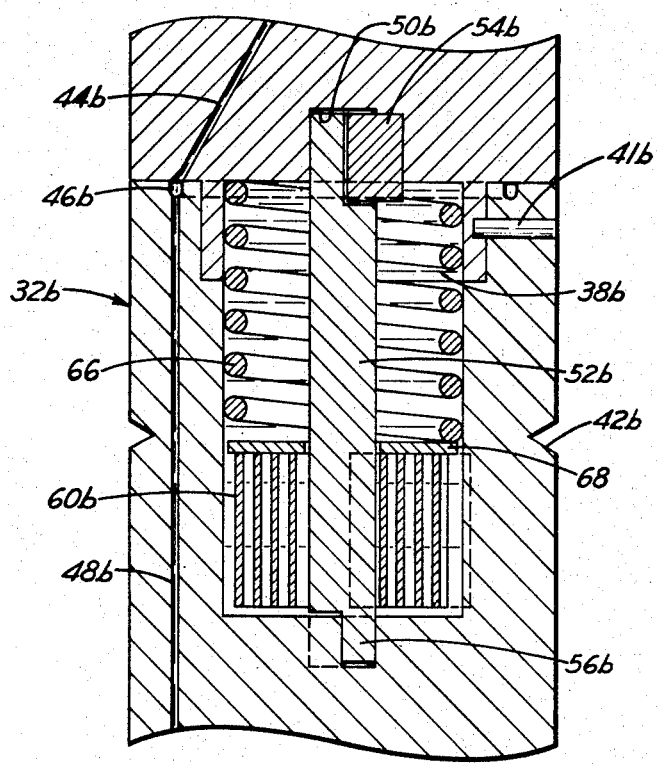
Figure 5:
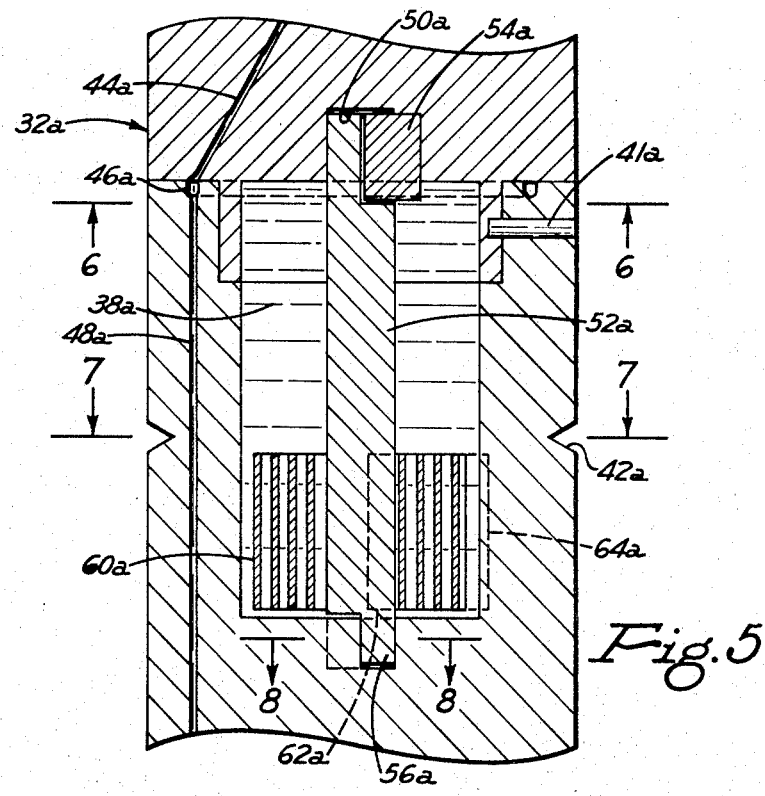
FIG. 5 is a cross-sectional elevational view of a first embodiment of a stem for use in FIG. 4.
Figure 6:
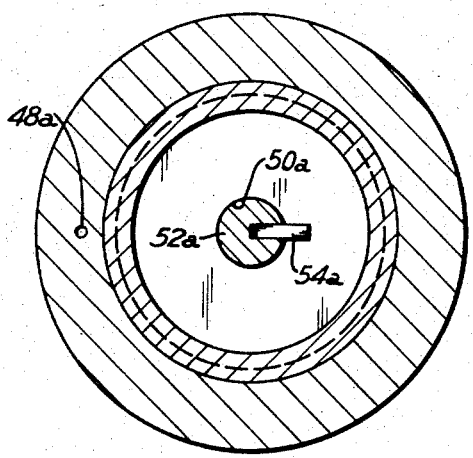
Figure 7:
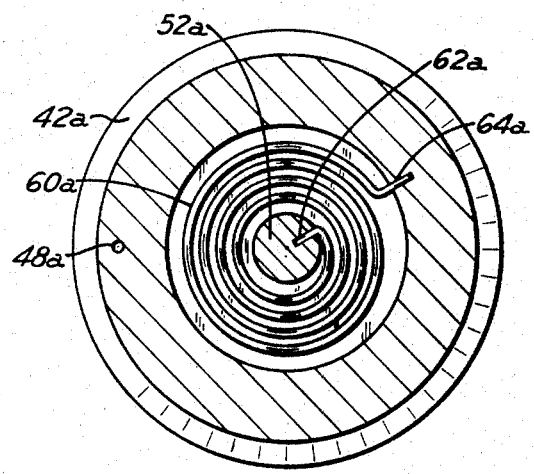
Figure 8:
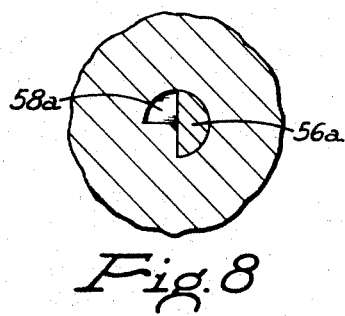

FIGS. 6, 7 and 8 are cross-sectional views taken on lines 6—6, 7—7, and 8—8 respectively of FIG. 5; and FIG. 9 is a view similar to FIG. 5 of a second embodiment of a stem usable in FIG. 4.

Figure 1:
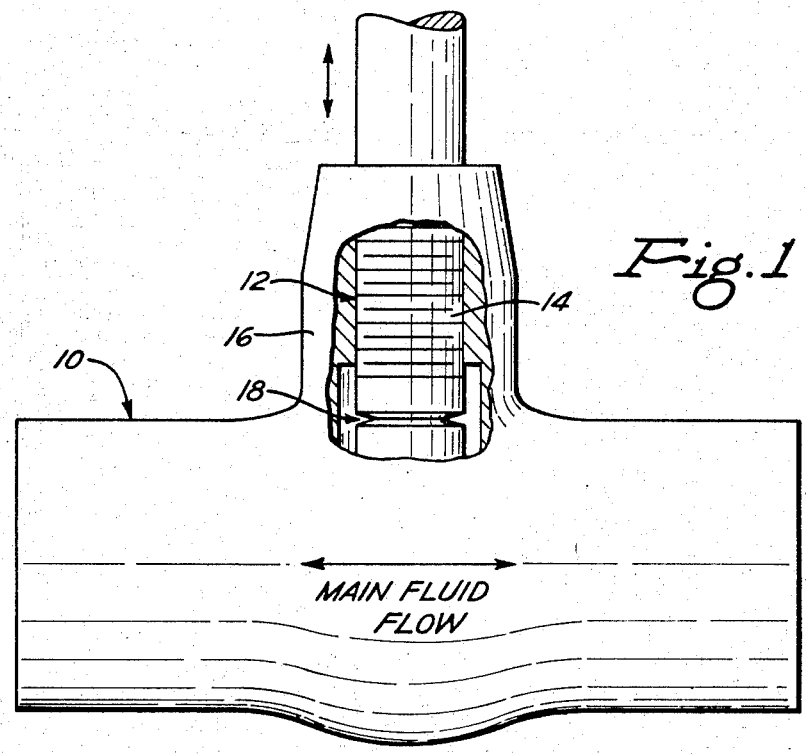
FIG. 1 is an elevational view of a typical translational stem motion type of valve, with part of the valve broken away to show the stem.

Referring now in detail to the drawing, 10 designates a typical valve in which the improved stem 12 of the invention may be fitted. The valve 10 and stem 12 of FIG. 1 are representative of all the various valves wherein the active member translates, i.e., moves up and down with respect to the axis of the stem to control the main fluid flow. Such valves are very well known and include gate valves and plug valves. The stem may be moved by a sliding motion, or as shown illustratively, by means of threads 14 which mate with suitably formed mating threads in the neck portion 16 of the valve 10. In an area in which the stem 12 is unobstructed by any other portions of the valve 10 in all positions of the stem, the stem is formed with a weakened portion 18, shown typically as simply a groove cut into the material of the stem. The weakened portion must be located inside the valve body, and also in such a position that it does not interfere with normal valve operation. Techniques are well known in the valve arts and in other arts, such as well drilling tools, to form such weakened portions so that the member will have a predetermined strength.

Figure 2:
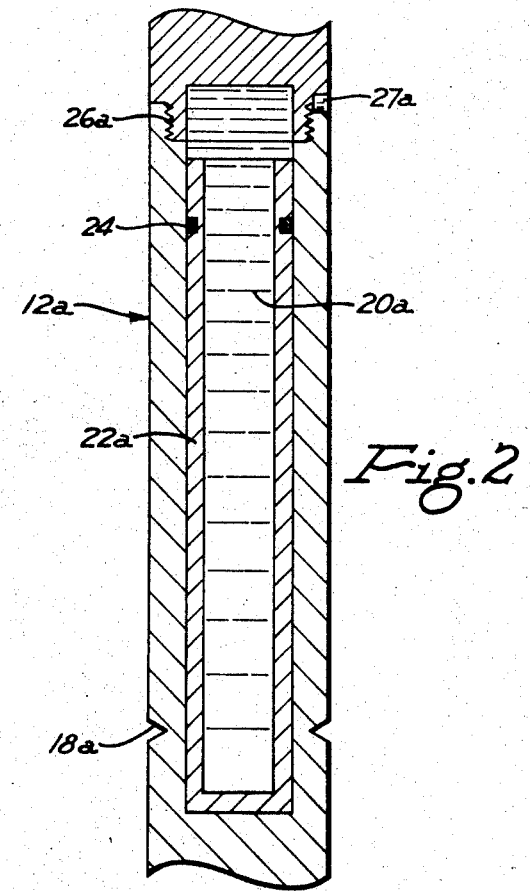
FIG. 2 is a cross-sectional elevational view of a first embodiment of the stem of FIG. 1.
Figure 3:
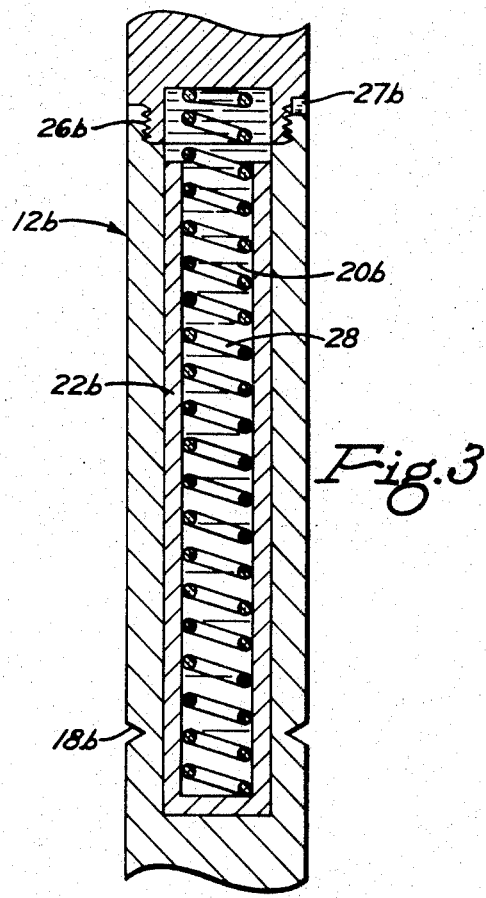
FIG. 3 is a cross-sectional elevational view of a second embodiment of the stem of FIG. 1.

A first embodiment 12a and a second embodiment 12b of stems including the invention particularly suitable for translational types of closing motion are shown in FIGS. 2 and 3, respectively. Wherever possible, the same parts are indicated in these two drawings by the same reference numerals followed by the appropriate "a" or "b" suffix.

Valve stem 12a is formed with an elongated central cavity which is filled with a liquid 20a and in which is positioned a sleeve 22a. The sleeve 22 of both embodiments is closed at its lower end adjacent the weakened portion 18 for a reason that will appear below. The sleeve 22a only is formed with a suitable groove to receive sealing means 24 which may comprise a spring ring or the like to form a fluid tight seal between sealing means 24 and the inside surface of the main cavity in the stem. Means are provided to assemble the stem of the invention, and to that end mating threads 26 in both embodiments are provided whereby the invention may be assembled as shown and then used in the valve 10 in a normal manner. The threads 26a and 26b, pinned as at 27 to prevent unintentional opening of the cavity, are exemplary only, welding, friction fit, or similar means could be substituted.

In selecting a particular liquid 20 for use in these two and in the other embodiments, it is desirable that the liquid not freeze, not be corrosive to the materials of the valve stem which it contacts, and yet be sufficiently temperature responsive to expand in response to heat to break the weakened portion, in its intended use. Mineral oil or pure hydrocarbons are presently preferred, generally.

An important feature of the invention is that it will respond at a predetermined selected temperature to close the valve. Many parameters can be adjusted to achieve this desideratum; different liquids respond differently, the dimensions and nature of the weakened portion 18 can be adjusted, the volume within the cavity which is in turn partly controlled by the dimensions of the sleeve 22, and/or a predetermined amount of liquid-free space left in the cavity, will all change the operating temperature.

In use, in the event the stem is exposed to a temperature greater than the preset temperature, then the liquid will expand sufficiently to break the stem at the weakened portion 18. It is well known that liquids expanding in response to heat produce tremendous forces, for example, a failure of a safety valve in a boiler can cause an explosion of that boiler, and this despite the fact that steam is a compressible fluid. Another example is where gaskets are broken in liquid pipelines when the full line is inadvertently sealed at both ends at night and left in that state into the next day's heat and sunshine. Upon breakage at the weakened portion 18, the liquid 20a remains captured within the sleeve 22a because of the seal 24, and the sleeve 22a functions as a piston to close the active valve member, not shown, connected to the lower end of the valve stem below region 18a. The dimension between the weakened portion 18a and sealing means 24, for any particular valve, when in the FIG. 2 position, is set such that when the valve is fully closed the seal 24 will be at or below weakened portion 18 so that the driving liquid is released to prevent damage to other parts of the valve, and also to form a lock between the sealing means 24 and the upper fixed part of the valve stem. Thus, the valve is automatically both locked closed and the driving liquid is allowed to escape. The valve will be locked closed despite the broken edge at 18 because the spring ring 24 expands slightly, thus preventing re-entry of the sleeve 22 into the stem 12.

The FIG. 2 form of the invention is particularly suited to valves which, in use, are either fully open or fully closed only. If the valve were partly closed, then the predetermined dimension between seal 24 and weakened portion 18a would be greater than that needed to bring the active valve member to the fully closed position, and it would be possible, under such conditions of misuse, for the invention to damage some other parts of the valve.

In FIG. 3, there is shown a second embodiment of the translational motion type of stem wherein the seal 24 is omitted, and the sleeve 22b fits loosely in the cavity in the stem 12b. A relatively strong compression spring 28 is added to the assembly of liquid 20b and loose fitting sleeve 22b. Thus, when the stem 12b is exposed to the operating temperature, the liquid 20b will rapidly escape, but the spring 28 guided by sleeve 22b will provide the additional needed driving force to close the active valve member, and will do so at whatever position of partly open or partly closed the active valve member happens to be in when the invention operates. Of course, spring 28 will be made of a suitable material to hold its temper at the preset operating temperature. In determining the predetermined operating temperature for this embodiment 12b, the strength of the spring 28 and the amount of liquid displaced by the spring 28 are important factors to be considered. Analytical methods for determining an operating temperature for all embodiments of the invention are well known to those skilled in the art, or alternatively, empirical methods could be used.

Referring now to FIG. 4, there is shown a valve 30 having a stem 32 which carries a stop 34 adapted to cooperate with a fixed stop 36 to limit the rotation of the stem 32 in the body of valve 30, all in a conventional manner. The valve 30 with the parts 32, 34 and 36 is representative of all the various valves wherein the active member rotates, i.e., the opening and closing action is a rotation of the valve stem about its own axis to thereby control the main fluid flow through the valve. This second class of valves, as is the case with the FIG. 1 type of valve, is very well known to those skilled in the art and includes, most typically, ball valves and rotating plug valves. Referring to FIGS. 5 and 9, there are shown two embodiments 32a and 32b of the rotational type of valve stem. As before, wherever possible, the same parts in FIGS. 5 and 9 are indicated by the same reference numerals followed by the appropriate "a" or "b" suffix.

Valve stem 32a of FIG. 5 has a central cavity which is filled with a liquid 38a. The valve stems 32 are held together by suitable fluid tight means, such as pins 41, or welding, or the like, which means serves the same purpose as the mating threads 26 and pins 27 of FIGS. 2 and 3. The stems 32 are provided with a weakened portion 42 similar to the structure 18 of the previous embodiments. Since these rotational types of valves are typically lubricated through the stem, there is provided a passageway 44, the lower end of which passageway 44 will meet with an annular groove 46, and thence with a passageway 48 which leads to the active valving member, not shown. At the upper end of the fluid filled central chamber, valve stems 32 are formed with a blind opening 50. One end of an operating rod 52 is secured into this opening 50 by means of a key 54, see FIG. 6. The connection between the upper end of rod 52 in the key 54 is such that the rod may not rotate with respect to the key, but is free to slide, axially, with respect to the key. At its lower end, rod 52 is formed with a half-round portion 56, see FIG. 8, which fits within a three-fourths quadrant blind opening 58. A coil spring 60 has one end fixed into rod 52 as at 62, see FIG. 7, is then relatively tightly wound around the rod 52, and has its other end secured into the body of stem 32 as indicated at 64. It should be noted that coil spring 60 will be entirely contained in the bottom half of stem 32, i.e., below weakened portion 42.

In the event the valves 32 should be exposed to a temperature greater than the predetermined operating temperature, then fluid 38 will expand sufficiently that the stem will break at portion 42. The energy stored in spring 60 is now released, and this energy attempts to turn the two broken halves of the valve stems in opposite directions. That is, anchor 64 attempts to turn the lower broken half in one direction, and anchor 62 via rod 52 and key 54 attempts to turn the broken half of the stem above section 42 in the opposite direction. It should be noted that the axial length of key 54 is such that the connection between the rod 52 and the key remains operative even after the expanding liquid has broken the valve stem and thereby possibly moved the rod axially on the key. The mineral oil or other expanding liquid, of course, immediately escapes as soon as breakage occurs. The rotation of the upper part of the broken valve stem is stopped by the interaction of the normally provided stops 34 and 36 in the full open position of said upper broken part. Of course, the stops 34 and 36 are exemplative only of the many different kinds of studs, stops, or the like travel limiting means normally provided on this type of valve. The lower broken part of the valve stem, carrying the active valve member, rotates 90° relative to the upper broken part, now held in the full open position, and is stopped by interaction of the solid quadrant defining three-quarter opening 58a. Since the closing member, not shown, of the valve is attached to this lower part, the valve is now closed.

The FIGS. 5 and 9 structures shown are preferred embodiments, but the essence of the invention can be embodied in further slightly modified forms. For example, the function of the sliding key arrangement 54 can also be incorporated into the half-round end 56 of the rod 52 by simply making half-round end 56 sufficiently long and its mating three-quarter quadrant opening 58 sufficiently deep to allow the small amount of axial motion which occurs upon breakage. In such a case, a solid connection could be provided between the rod and the cavity opposite the half-round end of the rod. Another modification possible is to reverse the structure as shown in FIGS. 5 and 9, i.e., the spring wound quadrant end could be in the upper end of the stem above weakened portion 42. In all cases, the embodiments 42 of the invention depend for their operation on the fact that the upper broken half will be easier for the spring 60 to turn than will the lower broken half. It is thought that this condition will occur naturally very frequently because the ball or active member in such valves cooperates with various seals and the like in such valves to make fluid tight connections which seals and the like produce more drag on the active member than on the broken upper end of the valve stem. Another possible modification would be to provide quadrant openings and half-round ends such as 58 and 56 at both ends of the chamber. Such structure would appear to be a redundant extra expense, although such extra parts could be arranged to operate in accordance with the invention.

However an embodiment is configured, the spring 60 should be so wound that the external valve stem part is biased to the open position, which will correspondingly mean that the active valve member part will be biased in the opposite closed position. The parts 56 and 58 will be so arranged within the valve stem that the 90° or quarter turn of motion available will be used to permit the spring force on the active member part of the stem to close the stem if breakage should occur when the active member is in any position other than the fully closed position. If the valve should happen to be closed when breakage occurs, the spring will first drive the upper half to the open position which will cause a motion between the parts 56 and 58 such that thereafter the active valve member may not be moved away from its normally closed position by the spring. If the valve happened to be in the open position when breakage occurred, then the spring cannot move the upper half, it being already against its open position stop, but the spring will be able to move the active member from that open position 90° around to the closed position.

In FIG. 9 there is shown the second embodiment 32b having the added feature of a compression spring 66 in the fluid filled chamber, one end of which bears against the top of the cavity, and the other end of which bears against a washer 68 seated on top of the coil spring 60b. The structure 66 and 68 assures separation between the broken halves at the region 42, and thereby facilitates turning of the parts as described above by the energy stored in spring 60b. The spring 66 is such that it drives the upper half only a short distance, and, if necessary in a particular embodiment, the travel limiting stops or the like, typified at 36, could be lengthened to accommodate this slight motion.

The invention would be fabricated of ordinary materials, all as is clear to those skilled in the art. For example, using a mineral oil or other hydrocarbon driving liquid, the various springs would most likely be made from suitably tempered spring steel. The operating rod 52 and sleeves 22 could be made from mild steel. The stems 12 and 32 themselves would be made from whatever material was already used in any particular valve, such as brass or steel.

While the invention has been described in detail above, it is to be understood that this detailed description is by way of example only, and the protection granted is to be limited only within the spirit of the invention and the scope of the following claims.

I claim:

1. In a valve having a valve stem which carries an active valve member, the improvement comprising a chamber in said valve stem, an expandable fluid in said chamber substantially filling said chamber, a weakened portion in said stem in a predetermined relation to said chamber therein and responsive to expansion of said fluid to break said valve stem at said weakened portion, and means in said chamber to move the active valve member on said valve stem to a closed position after said fluid has expanded sufficiently to break said valve stem.

2. The combination of claim 1, said fluid consisting of mineral oil.

3. The combination of claim 1, wherein said valve is closed after breakage by a translational motion of said active valve member with respect to the axis of said valve stem.

4. The combination of claim 3, said chamber being of generally elongated shape, said moving means in said chamber comprising a sleeve located within said chamber extending substantially coextensive with the length of said chamber, sealing means in said sleeve in spaced relation to said weakened portion, whereby upon breakage of said weakened portion said sealing means contains said expanding fluid and causes said sleeve to act as a piston to close said active member.

5. The combination of claim 3, said chamber being of generally elongated shape, said moving means in said chamber comprising a sleeve located within said chamber and loosely fitted therein and compression spring means within said sleeve within said chamber, whereby said expanding fluid will break said weakened portion to release said compression spring means to thereby close said active member.

6. The combination of claim 1, wherein said valve is closed after breakage by a rotational motion of said active valve member with respect to the axis of said valve stem, and wherein the broken valve stem part carrying the active valve member requires more energy to turn than does the other broken valve stem part.

7. The combination of claim 6, said moving means comprising an operating rod axially traversing said chamber, coil spring means interconnecting said rod with a portion of said valve stem to one side of said weakened portion, and means between the end of said rod carrying said coil spring means and the associated end of said chamber to permit substantially 90° of rotational motion therebetween.

8. The combination of claim 7, and means to permit limited sliding motion between at least one end of said rod and the associated portion of said valve stem at the associated at least one end of said chamber.

9. The combination of claim 8, said means to permit said limited sliding motion comprising a key and slot connection between the end of said rod opposite said coil spring means and the associated portion of said valve stem.

10. The combination of claim 7, said 90° motion permitting means comprising a three-quarter quadrant blind opening formed in said end of said chamber and a half-round end formed on said end of said rod and fitted into said blind opening.

11. The combination of claim 7, wherein said coil spring means and said 90° motion permitting means are located in said chamber on the active valve member side of said weakened portion.

12. The combination of claim 7, and compression spring means in said chamber having one end bearing against an end of said chamber and the other end operatively cooperable with said coil spring means, whereby upon breakage of said stem at said weakened portion said compression spring will separate the broken parts of said stem at said weakened portion to thereby facilitate rotation of said broken parts with respect to each other under the influence of said coil spring means.

13. The combination of claim 12, and a washer interposed between said coil spring means and said compression spring.

* * * * *